DAVID ALTMAN.

Improvement in Corn Planters.

No. 120,926.          Patented Nov. 14, 1871.

2 Sheets--Sheet 1.

Witnesses          Inventor

2 Sheets--Sheet 2.
DAVID ALTMAN.
Improvement in Corn Planters.
No. 120,926. 　　　　　　　　　　Patented Nov. 14, 1871.
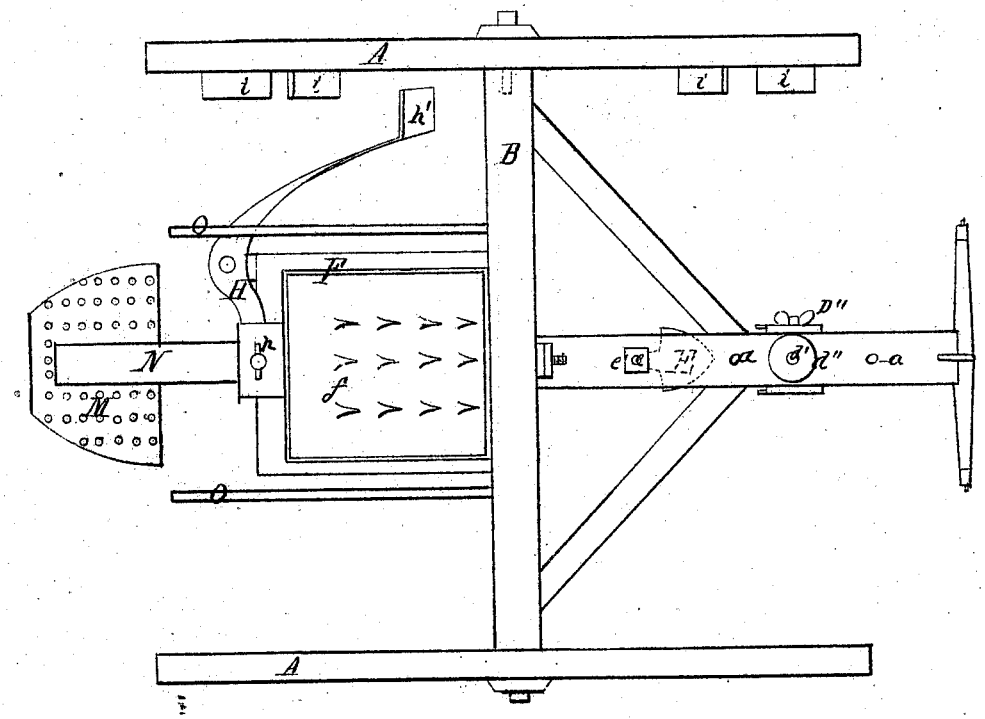
Witnesses,
F. B. Curtis.
Villette Anderson
Inventor
D. Altman,
Chipman Hosmer & Co
Attys

UNITED STATES PATENT OFFICE.

DAVID ALTMAN, OF NASHVILLE, TENNESSEE.

IMPROVEMENT IN CORN-PLANTERS.

Specification forming part of Letters Patent No. 120,926, dated November 14, 1871.

*To all whom it may concern:*

Be it known that I, DAVID ALTMAN, of Nashville, in the county of Davidson and State of Tennessee, have invented a new and valuable Improvement in Corn and Cotton Planter; and I do hereby declare that the following is a full, clear, and exact description of the construction and operation of the same, reference being had to the annexed drawing making a part of this specification, and to the letters and figures of reference marked thereon.

Figure 1:
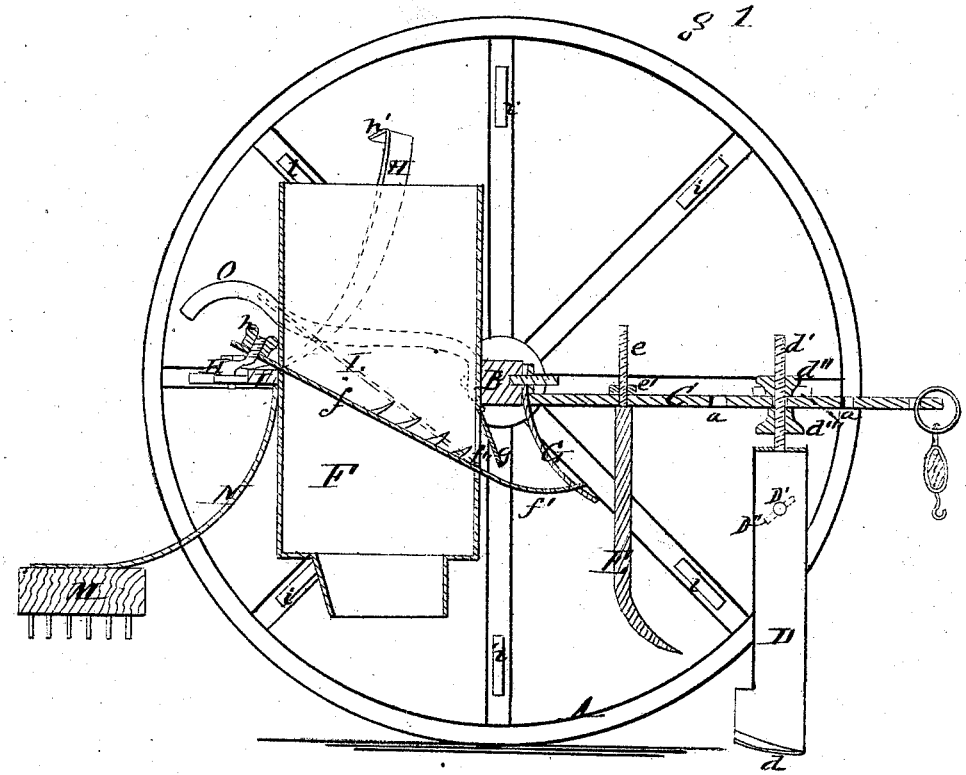
Figure 2:
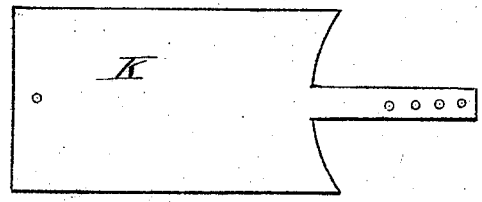

Figure 1 of the drawing is a representation of a central vertical longitudinal section of my invention. Fig. 2 is a detached view. Fig. 3 is a top view.

This invention has relation to certain improvements in cotton and corn planters; and the novelty consists in the hereinafter-described construction and arrangement of devices by the operation of which the ridge is formed and furrowed and the corn or cotton-seed dropped at intervals and covered.

Referring to the drawing, A represents a pair of driving-wheels, of which B is the axle. C represents the draft-beam secured to the front of the axle. D designates a scraper designed for the purpose of gathering the earth to form the cotton-ridge. It consists essentially of two vertical elastic standards or plates, united by a cross-piece at the top, and each constructed with an inwardly-projecting flange or lip, $d$, beveled off toward the front. This scraper is supported to the draft-beam by means of a screw-shank, $d'$, holding a nut, $d''$, which rests on the upper side of the beam. By means of said shank and nut the scraper may be adjusted to any desirable height to form different-sized ridges. A nut, $d'''$, is placed on the shank underneath the beam to prevent the scraper from being pushed up when brought in contact with the earth. The standards may be adjusted toward each other by means of a set-screw, D', and nut D''. E represents a plow adjusted to the beam which supports it by means of a screw-shank, $e$, and nut $e'$. The object of this plow is to cut the furrows in the ridges formed by the scraper, and hence it is located directly behind the scraper, with its point projecting toward it, as the drawing (Fig. 1) represents. A number of holes are made in the draft-beam, as shown at $a$, allowing the plow and scraper to be relatively adjusted so as to increase or diminish the distance between them. F indicates the hopper secured to the rear of the axle, and furnished with an inclined seed-slide, $f$, which may be used for cotton-seed planting. An arm, $f'$, of said slides projects through a slot, $f''$, in the front of the hopper, and is adapted to longitudinal vibration. The slot $f'''$ is provided with a gate, $g$, that accommodates itself to the motions of the slide, and at the proper times allows the cotton-seed to escape. The rear end of said slide projects through the back of the hopper, in which an opening is cut to let it pass, and is secured by a thumb-screw or nut, $h$, to the end of a lever, H. I represents a band surrounding the hopper and supporting it. The lever H is pivoted to said band, and is bent out toward one of the wheels, the spokes of which are furnished with studs $i$ arranged so as to act alternately on the end $h'$ of the lever as the wheel revolves.

Whenever the lever is projected forward by one of the studs $i$ the slide $f$ is drawn back and a quantity of seed deposited. The lever being released, the slide is drawn forward by a spring, G, secured to the axle, and holding the end of the slide-arm $f'$. The slide $f$, it will be seen, is provided with a number of pointed projections, $f''$, designed for the purpose of tearing apart the cotton-seeds which adhere together.

For planting corn a smooth slide, K, Fig. 2, is substituted for the one just referred to, and above it is placed another, shown in dotted lines, and marked L, Fig. 1. The rear end of the latter is supported in a slot at the back of the hopper, and is designed for the purpose of bearing the weight of the corn which passes to the under side from its forward end. It may be raised at the forward end by depressing the rear end in order to stop the escape of corn. The corn is dropped from the bottom of the hopper instead of through the cotton-seed opening, the door of which is to be closed, and for this purpose the slide K has a recess cut out in front which lets the corn fall through at intervals.

M denotes a coverer, consisting of a block furnished with teeth on its under side, and secured to the hopper by means of an arm, N. The latter should be elastic, so as to let the coverer pass lightly over the ridge, so as to merely cover in the corn or cotton-seed without breaking down the ridge. O indicates the handle by which the implement is held and guided.

I claim as my invention—

1. The scraper D having the elastic standards, as described, made adjustable by means of the screw D′ and nut D″, substantially as specified.

2. The toothed slide $f$ arranged to vibrate the hopper L, in combination with the gate or guard $g$, as and for the purpose set forth.

3. In a corn-planter, the combination of the adjustable inclined feeding-slide with the lever H, studded spokes $i$, spring G, and auxiliary locking-slide L, substantially as specified.

In testimony that I claim the above I have hereunto subscribed my name in the presence of two witnesses.

DAVID ALTMAN.

Witnesses:
B. F. MANLOVE,
W. H. BASKETTE.

(133)